UNITED STATES PATENT OFFICE.

HALVOR HALVORSON, OF CAMBRIDGE, ASSIGNOR TO JOSEPH BOYNTON, OF BOSTON, MASSACHUSETTS.

IMPROVEMENT IN RENDERING FATS.

Specification forming part of Letters Patent No. 171,613, dated December 28, 1875; application filed June 8, 1875.

*To all whom it may concern:*

Be it known that I, HALVOR HALVORSON, of Cambridge, in the county of Middlesex, State of Massachusetts, have invented a certain new and useful Improvement in Rendering Lard and other Fats, of which the following is a description sufficiently full, clear, and exact to enable any person skilled in the art or science to which my invention appertains to make and use the same.

My improvement relates more especially to means for utilizing the waste animal matter in slaughter-houses and meat-packing establishments; and consists in a novel method of chemically converting the same into fertilizing materials, as hereinafter more fully set forth and claimed, by which not only a new and valuable article of commerce is produced, but exceedingly important results attained in a sanitary point of view.

It is well known that in nearly all large slaughtering and meat-packing establishments the leaf-lard, suet, intestines, and other waste parts of the hogs or animals slaughtered which contain fat or oils, are placed in a closed tank or receiver of suitable construction, into which steam is blown or exhausted sufficiently long to disintegrate the contents, the resultant effect being the condensation of the steam, thus partially filling the tank with water on which the fat and oils float, and from which they are drawn off through proper faucets or cocks.

The residual contents of the tank after so drawing off the fats, consisting of water holding in solution a large proportion of animal matter, is technically called "soup," and is usually discharged into convenient connecting drains or sewers as worthless, thereby frequently producing very injurious sanitary effects by reason of the gases and effluvia arising from decomposition.

My improvement is designed to obviate this objection, and also to utilize the animal matter thus wasted; and to that end I make use of means which will be readily obvious to all conversant with the subject from the following description:

In carrying out my process or invention I place a quantity of the soup in any convenient vessel or receptacle, and treat it with a saturated solution of persulphate of iron until precipitation ceases, the precipitate thus formed being not only valuable as a fertilizer, but also, by subsequent treatment, for edible purposes, the gelatine being utilized in the latter case by sulphurization of the iron in any proper and convenient manner.

The treatment primarily described leaves a supernatant liquid susceptible of further treatment in like manner by any of the metallic or vegetable astringents in solution, according to the purposes for which the precipitate may be desired.

The production of the agent or compound employed is comparatively simple and inexpensive; and consists, preferably, in treating ordinary protosulphate of iron with nitric acid to saturation, the solution thus formed being added to the soup in the manner set forth.

Having thus explained my invention, what I claim is—

The improved process of utilizing "soup" described, consisting in treating the same with persulphate of iron, substantially as and for the purpose specified.

HALVOR HALVORSON.

Witnesses:
  C. A. SHAW,
  H. E. METCALF.